Oct. 6, 1964 B. HURKO 3,151,608
OVEN WITH SOIL PROTECTION LINER
Filed April 29, 1963

INVENTOR.
BOHDAN HURKO
BY Richard L. Caslin
HIS ATTORNEY

United States Patent Office 3,151,608
Patented Oct. 6, 1964

3,151,608
OVEN WITH SOIL PROTECTION LINER
Bohdan Hurko, Louisville, Ky., assignor to General Electric Company, a corporation of New York
Filed Apr. 29, 1963, Ser. No. 276,352
5 Claims. (Cl. 126—19)

The present invention relates to ovens and particularly to the use of removable cloth sheets of high temperature material serving to line at least some of the inner surface of the oven liner of a baking oven for domestic use.

Probably the major annoyance in using an oven is the difficulty encountered in keeping the walls of the oven liner clean. During the normal cooking operation food particles and grease spatterings often strike the hot oven surfaces where they are partially burned so that they not only change color to a dark brown, but what is far more objectionable they adhere tenaciously to the surfaces. Strong cleaning agents have been provided for application to the oven walls for the express purpose of removing food soil from them, but even the best of these cleaning agents require a strong rubbing action and in any event it is very difficult and an awkward operation to reach all areas of the oven liner. Moreover, these cleaning agents are somewhat dangerous to use because they are strong chemicals that must never enter the human eye or be used in direct contact with the skin.

In recent years there has been a tendency toward the use of disposable aluminum foil sheets or a disposable aluminum foil bag but the use of aluminum foil has one disadvantage in that the aluminum foil does not match the emissivity of the oven liner since the aluminum foil is a metal and the oven liner is coated with a non-metal; namely a vitreous enamel. Accordingly, the use of the aluminum foil changes the cooking performance of the oven which may give in some instances unexpected adverse results. Of course, the oven could be designed for using aluminum foil and acceptable results would be obtained, but definite disadvantages do arise when the housewife uses aluminum foil indiscriminately in the standard oven that has not been particularly designed to accommodate the foil. Another disadvantage is that the aluminum foil is easy to tear and wrinkle and it complicates the design of the support means for the oven racks within the oven cavity. Moreover, aluminum foil is not easy to handle nor to clean once it has been soiled, so that heretofore the aluminum foil has been discarded once it has become soiled.

The principal object of the present invention is to provide a baking oven with removable cloth sheets of high temperature material which are easy to clean and will match the emissivity of the enamel coated oven liner by being impregnated with a high temperature plastic.

A further object of the present invention is to provide a removable oven liner shield which is of flexible sheet material that is easy to handle as well as easy to clean so that it may be reused over a long period of time.

A still further object of the present invention is to provide a reusable oven liner shield of high temperature cloth construction that is impregnated with a continuous coating of plastic that will withstand high temperatures and will not permit the grease and food soil to adhere thereto.

The present invention, in accordance with one form thereof, relates to a baking oven having a box-like oven liner cooperating with a hinged oven door to form a closed cavity. A heating means is provided for the oven so as to be able to raise the temperature thereof to cook food placed therein. The inner surface of one or more of the walls of the oven liner are covered with a cloth sheet of material of high temperature resistance that is impregnated with a high temperature plastic having a slippery surface such as polytetrafluoroethylene so that food soils will not adhere thereto.

My invention will be better understood from the following description taken in conjunction with the accompanying drawing and its scope will be pointed out in the appended claims.

Figure 1:
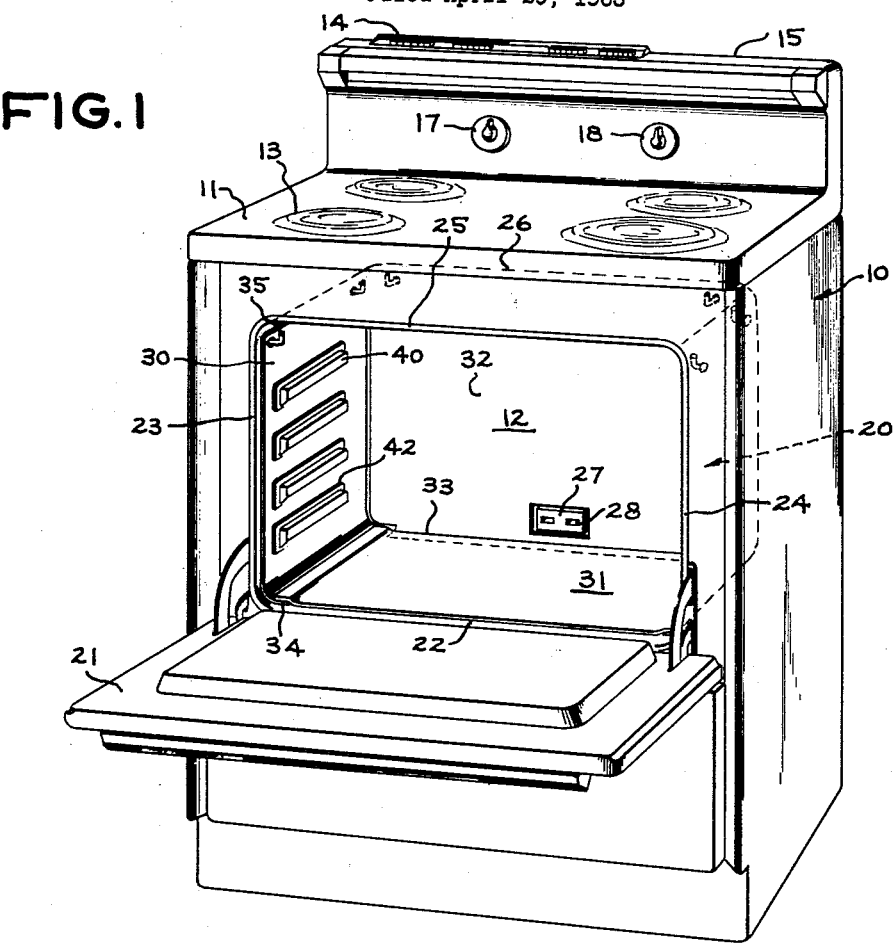
FIGURE 1 is a perspective view of a free-standing electric range embodying the removable cloth sheets protecting the inner walls of the oven liner from food soil.

Turning to a consideration of the drawing and in particular to FIGURE 1, there is shown a free-standing electric range having a cabinet structure or range body 10 that includes a top cooking surface 11 and an underlying oven cavity 12 as in most standard ranges whether they be gas or electric. The cooking surface 11 is shown with a plurality of surface heating units 13, it being understood that each heating unit has a separate selector switch 14 cooperating therewith for governing the various heating levels of the unit. The back edge of the cooking surface 11 is provided with a control panel or backsplasher 15 in which the heating controls for both the surface units and the oven are located. The rotary knobs 16 and 17 might be attached to an oven switch and an oven thermostat respectively. Of course, additional controls such as circuit breakers, clock-timers, and automatic surface unit controls are available in the more deluxe model ranges for increasing the ease of cooking in the home.

The oven cavity 12 is formed by a cooperation between a box-like oven liner 20 and a front-opening hinged door 21 that is used for closing the front opening in the oven liner as well as for gaining access to the oven. The oven liner has a bottom wall 22, opposite side walls 23 and 24, a top wall 25, and a back wall 26. Heating means must be provided for the oven to perform the various cooking operations. In an electric range there would be a lower bake unit (not shown) in the form of a looped metal sheathed resistance element and an upper broil unit also formed by a looped metal sheathed resistance element. The broil unit differs from the bake unit in that it is usually provided with a reflector member in the form of an inverted shallow pan that overlies the broil unit and is positioned between the broil unit and the top wall 25 of the oven liner for focusing the heat towards the food to be cooked in the oven cavity. The reflector also restricts the amount of heat that is transmitted to the cooking surface 11 which surface might otherwise become too hot; if for instance, the four surface heating elements 13 were to be used simultaneously with the oven. Shown in the back wall 26 of the oven liner is an electrical connector block 27 having female contacts 28 for receiving the terminal blades of a bake unit that would be connected to the block. The bake unit would also have supporting feet resting on the bottom wall 22 of the oven liner to support the bake unit above the bottom wall by a distance of about one-half to one inch.

Various attempts have been made in the past to increase the ease of cleaning the inner surfaces of the oven liner of the food soil and grease spatterings that accumulate during periods of oven use. An early approach consisted of using separate sheets of aluminum foil covering several of the walls of the oven liner. Special support frames were provided for the side walls so that the aluminum foil could be assembled therewith. One disadvantage in using aluminum foil is that it is easy to tear and easy to wrinkle which renders it somewhat cumbersome to handle. A principal disadvantage is that aluminum foil being metallic has an entirely different emissivity than the non-metallic porcelain enamel which is the usual coating applied to the inner surface of the standard oven liner. Accordingly, the aluminum foil changes the cooking performance of the standard oven which may give in some instances unexpected results and might necessitate the housewife relearning her cooking skills.

Another solution has been the use of an aluminum foil bag which may be pulled over a supporting framework and the entire assembly positioned within the oven cavity as is taught in the Kirschke Patent No. 2,912,559 which is also assigned to the General Electric Company, the assignee of the present invention.

Another solution to this problem has been to have the entire oven liner removable by sliding it out part way from the range body so that it can be cleaned through an opening in the top wall of the oven liner. Also in recent years much research has been conducted on an automatic oven cleaning system where the oven liner soil is removed by pyrolysis by raising the oven temperature to a heat cleaning temperature range between about 750° F. and 950° F. as is taught in Patent No. 3,121,158 of the present applicant which was filed on December 13, 1962 and was a continuation-in-part of the original application Serial No. 27,926 which was filed in the Patent Office on May 9, 1960 and was abandoned in favor of the continuation-in-part application.

Figure 2:
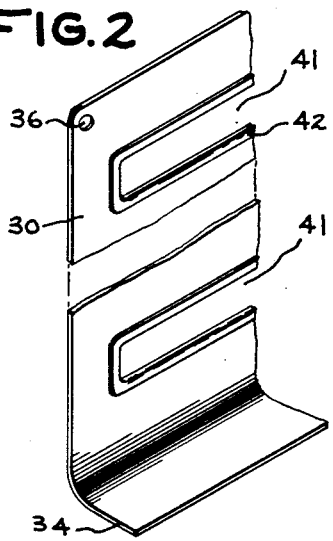
FIGURE 2 is a fragmentary perspective view of a cloth sheet for one of the side walls of the oven liner shown in FIGURE 1 having cut-out portions for accommodating the shelf support embossments of the side walls.

I hereby propose the adoption of removable and reusable oven liner panels such as the cloth sheet 30 shown in FIGURE 2. This material is a woven fiberglass or aluminum cloth having a thickness of about 5 mils and it is impregnated with a high temperature plastic such as polytetrafluoroethylene which is available on the market under the Du Pont registered trademark Teflon. Teflon is a high temperature material which retains a slippery surface such that it has a non-adhesive property which makes is desirable for use in coating cooking utensils as is taught in the Cahne Patent 3,008,601, for foods do not stick to the Teflon. This Teflon material has been tested under conditions where it coats the entire inner surface of the oven liner, but it has the disadvantage that it presents a soft layer that is fairly easy to scratch, so that the Teflon does not represent a permanent coating which would remain satisfactory for the life of a standard range which is designed to be about 20 years. This may be explained by emphasizing that Teflon has a non-stick propensity toward both food soils and the supporting medium such as the metal oven liner or cooking utensil.

A principal advantage in using the Teflon on a high temperature cloth base such as fiberglass and perhaps aluminum cloth is that the cloth is completely embedded in the Teflon to present a permanent finish that appears as a smooth slippery surface a little like oil cloth yet will withstand high temperatures. Moreover, the cloth is a flexible material that will bend around corners and be usable in forming an overlap joint with the sheet covering the bottom wall of the oven liner. This is best seen in FIGURE 1 where the bottom wall 22 of the oven liner is covered with a Teflon impregnated fiberglass sheet 31, the two side walls 23 and 24 of the oven liner are covered with side panels 30 of the same material, and the back wall 26 of the oven liner is covered with a back panel of Teflon impregnated fiberglass 32. The lower edge 33 of the back panel 32 is folded under the back edge of the bottom wall panel 31. Similarly the side wall panel 30 has a lower edge 34 that is folded under the side edges of the bottom panel 31. Each of the vertical panels 30 and 32 are suspended from hook members 35 that are fastened to the side walls and back wall of the oven liner adjacent the top of the oven cavity, and suitable openings such as 36 are formed in the panels so that the panels may be supported from the hooks by threading the hooks through the openings 36. Another sheet of this plastic coated fiberglass could be fastened over the portion of the inner surface of the door 21 which extends into the oven cavity 12 for maximum soil protection.

As in standard range construction, the side walls 23 and 24 of the oven liner are provided with rack supports in the form of inner embossments or ledges 40 which are shown as four in number and vertically spaced from each other. The racks are not illustrated in the drawing, but they are of welded wire construction that are supported along the side edges from these embossments and the racks are capable of being slid in and out of the oven cavity. Accordingly, the removable side panels 30 must be designed to accommodate these embossments. One solution is shown in FIGURE 2 which is to form cutout openings 41 in the side panels 30 so that the embossments will extend through the openings and the panels may lie flat against the side walls of the oven liner. These cutout openings 41 may be reinforced by turning back the edge of the openings as is shown at 42 and hemming the edge or ironing it flat.

Figure 3:
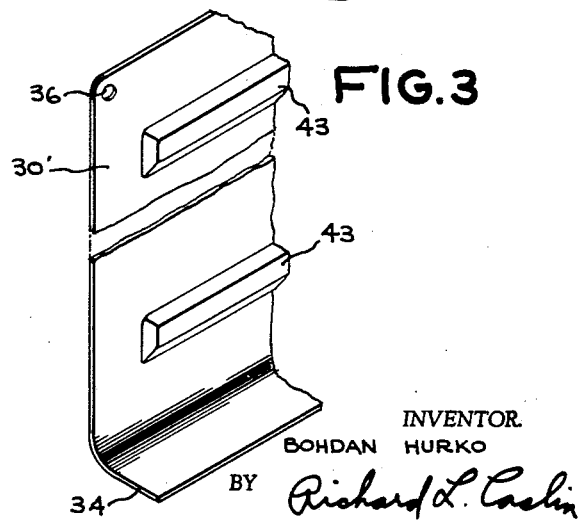
FIGURE 3 is a perspective view similar to that of FIGURE 2 of a modified cloth sheet which is formed to overlie the shelf support embossments on the side walls of the oven liner.

A second solution to the side wall embossment problem is shown in FIGURE 3 by way of shaping the side panels 30′ with complementary forms 43 by applying pressure and heat to cause the cloth layer to assume the general shape of the embossment 40 and provide a custom fit, while permitting the side panel 30′ to lie flat against the side walls 23 and 24 of the oven liner.

Undoubtedly, the chemical industry will develop in the future improved high temperature plastics that have the same desirable characteristics as the polytetrafluorethylene material which has proved successful to date. Accordingly, it is felt that the scope of this invention should be considered to encompass not only the use of the polytetrafluorethylene type of plastic specifically recited, but all improved plastics having the same nature.

Modifications of this invention will occur to those skilled in this art, therefore, it is to be understood, that this invention is not limited to the particular embodiments disclosed, but that it is intended to cover all modifications which are within the true spirit and scope of this invention as claimed.

What I claim as new and desire to secure by Letters Patent of the United States is:

1. In a baking oven having a closed oven cavity formed by a box-like oven liner having a front opening that is adapted to be closed by an oven door, said oven liner having a bottom wall, opposite side walls, a top wall, and a back wall, heating means included for the oven for raising the temperature so as to cook foods placed therein, and one or more removable and replaceable cloth sheets of high temperature material that are impregnated with polytetrafluoroethylene, the sheets being supported against the inner walls of the oven liner so as to shield them from being soiled with grease and food drippings during the cooking operation as well as to increase the ease of cleaning the cloth sheets once they are soiled.

2. A baking oven formed by a box-like oven liner with a bottom wall, opposite side walls, a back wall and a top wall and an open front, an oven door provided for the oven and adapted to close the front opening to form a closed oven cavity, the interior wall surface of the oven liner being coated with a dielectric material such as vitreous enamel, heating means included in the oven for raising the temperature of food placed therein, and a plurality of individual woven fiberglass sheets that are each impregnated with polytetrafluoroethylene, each sheet being supported against the inner surface of one of the walls of the oven liner, the related edges of the adjacent sheets being overlapped to provide better soil protection for the oven liner, the cloth sheets having approximately the same emissivity as the interior wall surface of the oven liner.

3. A baking oven having walls forming a box-like structure, a plurality of individual removable sheets mounted on the interior of at least some of the walls, each sheet being a woven fiberglass that is completely coated with polytetrafluoroethylene, one sheet covering the bottom wall of the oven, and fastening means adjacent the top of the oven for hanging the sheets on the vertical walls of the oven, and heating means for raising the temperature of the oven for cooking food placed therein.

4. A baking oven having walls forming a box-like structure with a bottom wall, opposite side walls, a back wall and a top wall, there being a front-opening door mounted on the oven for gaining access thereto, the opposite side walls containing inner embossments forming supports, and rack means for installation into the oven and adapted to be supported from the said embossments, heating means provided for the oven for raising the temperature thereof so as to cook foods placed therein, and means for protecting the inner surfaces of the oven from food soil in the form of sheets of woven fiberglass impregnated with polytetrafluoroethylene, one removable sheet covering the bottom wall, the opposite side walls and the back wall of the oven having fastening means adjacent the top portions thereof, and removable sheets hung from the fastening means on said three walls, the two sheets on the opposite side walls being custom fitted to the embossments by having cutout portions in the area of the embossments so that the embossments extend through the cutouts and the sheets lie flat against the side walls of the oven.

5. A baking oven formed by a box-like oven liner and a front opening door cooperating with the oven for closing the front wall thereof and forming a closed oven cavity, the oven liner having a bottom wall, opposite side walls, a back wall, and a top wall, each of the two opposite side walls including a plurality of inner embossments and rack means supported in the oven on said embossments for obtaining the vertical adjustment of the racks, and heating means for the oven so as to raise the temperature thereof and cook foods placed therein, and a plurality of individual removable sheets adapted to be mounted on the interior surface of at least some of the walls of the oven liner, each sheet being of woven material taken from the group comprising fiberglass and aluminum thread and being impregnated with a polytetrafluoroethylene, one sheet covering the bottom walls, and a sheet for each of the two opposite side walls and the back wall of the oven liner, the sheets for the side walls being custom formed to fit flush against the side walls and to follow the contour of the inner embossments, and fastening means for the opposite side walls and back wall adjacent the top portion thereof, the removable sheets being suspended from the fastening means for ease in installing and removing the sheets from the oven.

References Cited in the file of this patent
UNITED STATES PATENTS

| | | |
|---|---|---|
| 2,537,433 | Waring | Jan. 9, 1951 |
| 2,562,117 | Osdal | July 24, 1951 |
| 2,728,698 | Rudner | Dec. 27, 1955 |
| 2,797,680 | Nagel | July 2, 1957 |
| 2,816,348 | Adamik | Dec. 17, 1957 |
| 3,008,601 | Cahne | Nov. 14, 1961 |
| 3,120,224 | Divelbiss | Feb. 4, 1964 |

FOREIGN PATENTS

| | | |
|---|---|---|
| 565,250 | Great Britain | Nov. 2, 1944 |
| 633,284 | Canada | Dec. 26, 1961 |